(12) United States Patent
Schindler et al.

(10) Patent No.: US 7,698,580 B2
(45) Date of Patent: Apr. 13, 2010

(54) INLINE POWER POLICING

(75) Inventors: Frederick Roland Schindler, Sunnyvale, CA (US); Asok Tiyyagura, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 802 days.

(21) Appl. No.: 11/509,947

(22) Filed: Aug. 25, 2006

(65) Prior Publication Data

US 2008/0052546 A1 Feb. 28, 2008

(51) Int. Cl.
*G06F 1/00* (2006.01)
*G05D 23/00* (2006.01)
*F02P 3/02* (2006.01)

(52) U.S. Cl. ............... 713/300; 713/324; 700/297; 323/371

(58) Field of Classification Search ........... 713/300, 713/324; 700/297; 323/371
See application file for complete search history.

(56) References Cited

U.S. PATENT DOCUMENTS

| | | | |
|---|---|---|---|
| 7,337,336 B2 * | 2/2008 | Ferentz et al. ............ 713/300 |
| 7,400,062 B2 * | 7/2008 | Pincu et al. ............... 307/29 |
| 2004/0230846 A1 * | 11/2004 | Mancey et al. ............ 713/300 |
| 2005/0262364 A1 | 11/2005 | Diab et al. |
| 2006/0092000 A1 | 5/2006 | Karam et al. |
| 2007/0028130 A1 * | 2/2007 | Schumacher et al. ...... 713/320 |
| 2007/0135086 A1 * | 6/2007 | Stanford ................... 455/402 |

OTHER PUBLICATIONS

IEEE 802.1D-2004, IEEE Standard for Local and Metropolitan Area Networks, Media Access Control (MAC) Bridges, Jun. 9, 2004.

* cited by examiner

*Primary Examiner*—Chun Cao
*Assistant Examiner*—Stefan Stoynov
(74) *Attorney, Agent, or Firm*—Cindy Kaplan

(57) ABSTRACT

In a wired data telecommunication network power sourcing equipment coupled to a powered device performs policing of power drawn by the powered device. In one embodiment, a method includes monitoring power drawn by the powered devices at power sourcing equipment, each powered device having a policing limit associated therewith. If power drawn by one of the powered devices exceeds the policing limit, it is determined if a power budget of the power sourcing equipment continues to provide power to the powered devices. If the power budget has been exceeded, action is initiated at the power sourcing equipment. The action may include sending or logging a warning, requesting the powered device to reduce its power requirement or removing power from one of the powered devices. An apparatus for policing inline power is also disclosed.

26 Claims, 6 Drawing Sheets

INLINE POWER POLICING

BACKGROUND OF THE INVENTION

Inline power (also known as Power over Ethernet (PoE)) is a technology for providing electrical power over a wired telecommunications network from power sourcing equipment (PSE) to a powered device (PD) over a link section. The power may be injected by an endpoint PSE at one end of the link section or by a midspan PSE along a midspan of a link section that is distinctly separate from and between the media dependent interfaces (MDI) to which the ends of the link section are electrically and physically coupled.

PoE is defined in the IEEE (Institute of Electrical and Electronics Engineers, Inc.) Standard 802.3-2005, published Dec. 9, 2005 and entitled "IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, which is incorporated herein by reference. The IEEE 802.3 standard combines the transmission and reception of Ethernet packets with the transmission and reception of DC-based power over the same set of wires in a single Ethernet cable. The IEEE is currently working on an amendment to the standard, referred to as PoE Plus (IEEE 802.3at), which is expected to extend the 802.3 standard power delivery capability to provide increased power to PDs. Inline power is also available through techniques that are non-IEEE 802.3 standard compliant.

In accordance with the 802.3 standard, a PSE carries out a detection process, and if successful, a classification process. The detection process is performed to detect the presence of a PD at a network port prior to sending power to it and to prevent sending power and causing damage to devices that are non-compliant with the PoE standard. The classification process set forth in 802.3, involves applying a voltage in a classification range to the PD. The PD may use a current source to send a predetermined classification current signal back to the PSE. This classification current signal corresponds to the class of the PD. Following classification, if sufficient power is available at the PSE, the PSE allocates and supplies power to the PD.

While the 802.3 standard delivers different wattages, powered devices are often allocated more power than they need. Furthermore, the IEEE 802.3 standard does not describe how power is managed within a PSE or how a PSE determines actual PD power requirements.

The average power available on a PSE port can be less than the maximum PD power demand. Power is typically allocated based on an assumption that the power requested by the PD matches the real power demand. However, PDs sometimes draw more power than their reported power demand. This may be, for example, due to defective PDs or failure to take into account system cable loss or system component variations when specifying a PD power demand.

It is therefore desirable to provide a method and system for policing inline power to manage power and increase the likelihood that a powered device remains powered on even if one or more powered devices incorrectly reports its peak power requirement.

Overview

A method and apparatus for policing inline power are disclosed. The method generally includes monitoring power drawn by one or more powered devices at power sourcing equipment, each of the one or more powered devices having a policing limit associated therewith. If power drawn by one of the powered devices exceeds the policing limit for the powered device, it is determined if a power budget of the power sourcing equipment has been exceeded. If the power budget has not been exceeded, the power sourcing equipment continues to provide power to the powered devices. If the power budget has been exceeded, action is initiated at the power sourcing equipment. The action may include, for example, sending or logging a warning, requesting the powered device to reduce its power requirement, or removing power from one of the powered devices.

The apparatus generally includes power sourcing equipment operable to provide inline power to one or more powered devices, each of the powered devices having a policing limit associated therewith, and a monitor configured to monitor power drawn by the one or more powered devices. The apparatus further includes a controller configured to detect a powered device exceeding its policing limit and determine if a power budget of the power sourcing equipment has been exceeded. If the power budget has not been exceeded, the power sourcing equipment continues to provide power to the powered devices. If the power budget has been exceeded, an action is initiated at the power sourcing equipment. Memory is provided for storing the policing limits and the power budget.

Further understanding of the nature and advantages of the embodiments described herein may be realized by reference to the remaining portions of the specification and the attached drawings.

BRIEF DESCRIPTION OF THE DRAWINGS

Corresponding reference characters indicate corresponding parts throughout the several views of the drawings.

DESCRIPTION OF EXAMPLE EMBODIMENTS

Figure 1A:
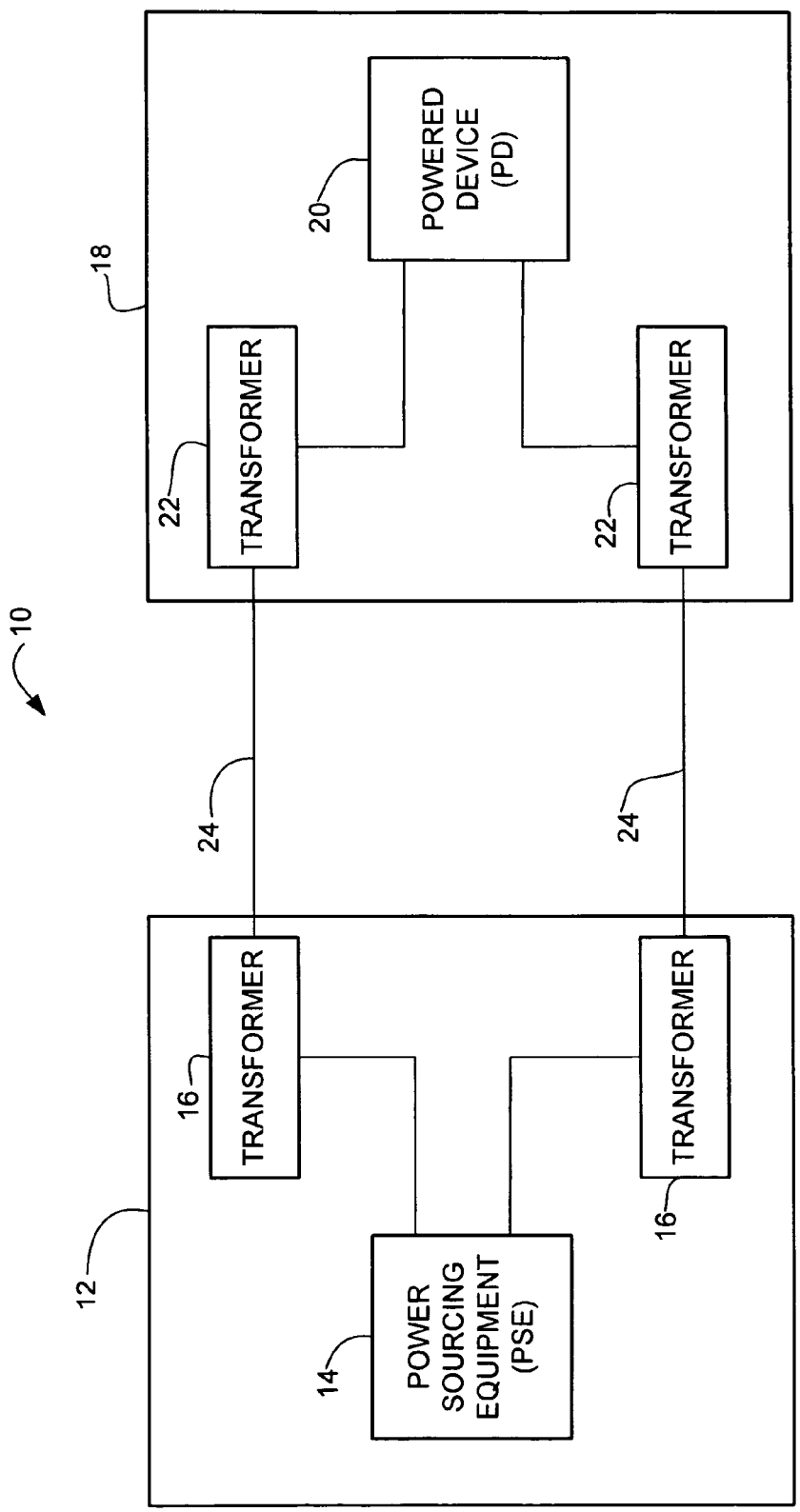
FIG. 1A illustrates an example of a powered network connection that may be utilized to implement embodiments described herein.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system described herein provide policing of inline power. Policing is used to identify powered devices (PDs) that are drawing too much power due, for example, to a failure or incorrect reporting of peak power demand. Power may be removed from a powered device, for example, when the average power drawn exceeds a set limit and the remaining power sourcing equipment (PSE) power budget has been exceeded. The use of policing may allow multiple powered devices to be connected to a single power supply even though the total power required by the powered devices may exceed the power available from the power supply.

In one embodiment, the system and method utilize a "Power Quality of Service" (PQoS) in which specified low priority ports have their power removed first when a system power budget is exceeded. This allows a network manager to preallocate power to priority powered devices such as critical phones to ensure these powered devices are preferentially powered. The system may intelligently withdraw power from powered devices that are low priority to maintain the system's overall power budget integrity. The priority level of a device may be set by a network administrator or it may be assigned based on the owner of the powered device or type of powered device, for example. The priority levels assigned to the powered devices or ports may include two or more different priority levels.

The system and method may also employ statistical based powering wherein port power demand is monitored and a budget is created based on statistics. The average amount of power required to deliver Power over Ethernet is generally less than the maximum budgeted, as a powered device will typically draw less power when in a quiescent state. When the number of ports sharing a power source is large, it becomes more likely that many of the ports are operating below their peak power. The difference between the peak power requested and the actual average power consumption provide additional power than is normally allocated. For a corner case, where a system demand exceeds available power, power can be removed from low priority ports. Another option is for the power source to request PDs to lower their power requirements using CDP (Cisco Discovery Protocol), for example.

Figure 1B:
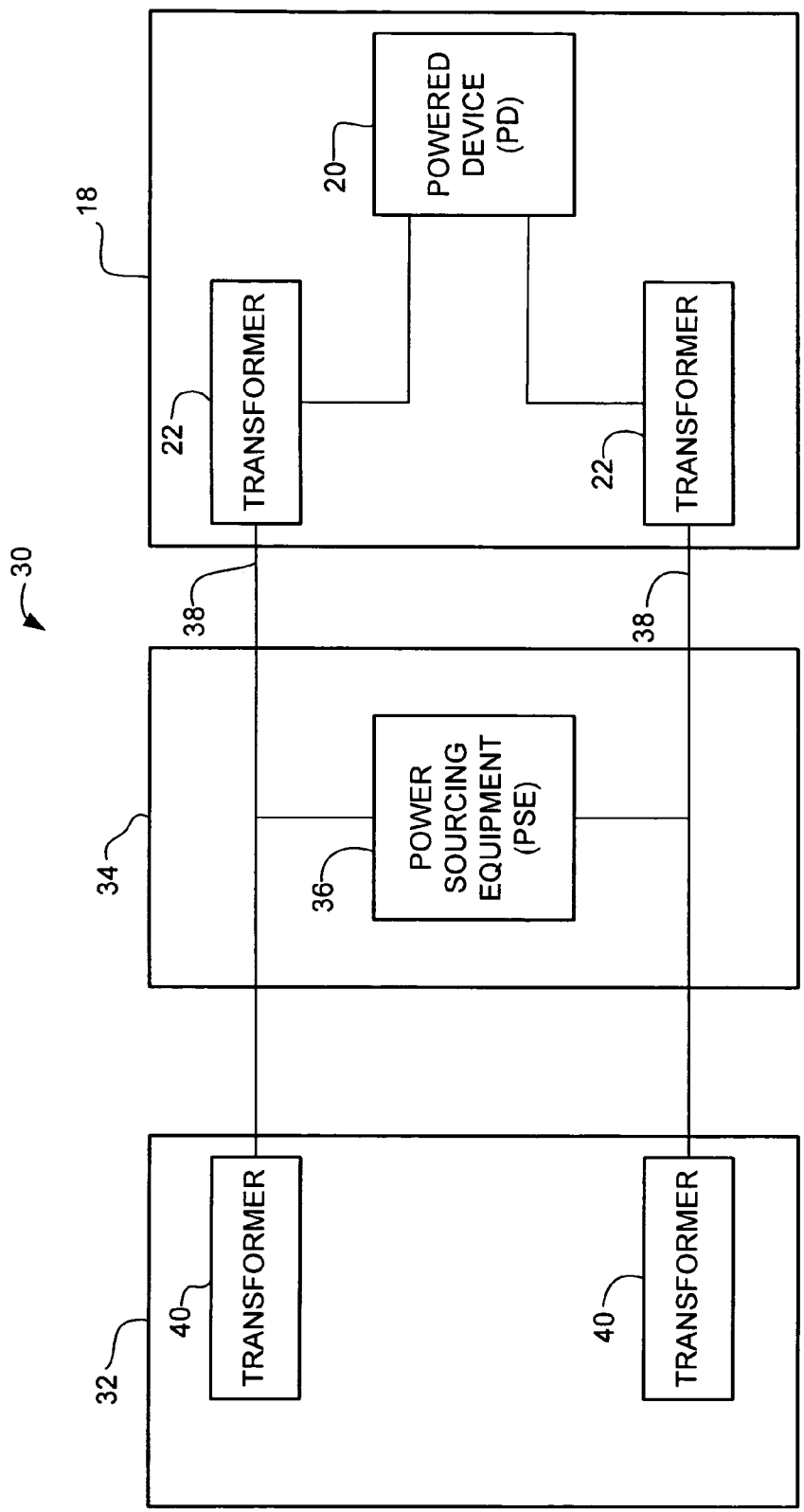
FIG. 1B illustrates another example of a powered network connection that may be utilized to implement the embodiments.

Referring now to the drawings, and first to FIGS. 1A and 1B, power delivery systems for delivering power to one or more powered devices over Ethernet cables are shown. In FIG. 1A a data telecommunications network 10 includes a network device 12 comprising integral power sourcing equipment (PSE) 14 (endpoint PSE) and transformers 16, and a powered end station 18 comprising powered device 20 and transformers 22. The network device 12 may be a switch, hub, router, or other network equipment. The powered device 20 may be a telephone, personal computer, personal digital assistant, laptop, wireless network access point, docking station, surveillance camera, various types of sensors and data acquisition equipment, or any other device that may be powered over Ethernet lines. The powered device 20 requests or draws power from the PSE 14 through Ethernet cables 24. Power from PSE 14 is injected on the cables 24 via transformers 16.

In FIG. 1B a data telecommunications network 30 includes midspan power insertion equipment (MPIE) 34, powered end station 18 comprising powered device 20 and transformers 22, and a network device 32 without integral power sourcing equipment. Similar to network device 12 in FIG. 1A, the network device may be a switch, hub, router, or other network equipment involved in the data transmission path, and includes transformers 40. MPIE 34 includes PSE 36 (midspan PSE) to provide power to powered device 20. The PD 20 requests or draws power from PSE 36 through network cables 38. The MPIE passes data therethrough and provides power on the cable pairs not used for signals (in the case of 10/100 Mbps Ethernet) and therefore does not require a coupling transformer. A 10/100/1000 system typically uses all wires within the cable for signal transmission and the MPIE couples into a signal pair using a transformer.

It is to be understood that the communications networks shown in FIGS. 1A and 1B are provided as examples and the network on which the embodiments are implemented may be different than shown herein. For example, the network device 12, 32 or midspan power insertion equipment 34 may include one or more PSEs 14, 36 to provide power to one or more PDs 20.

Figure 2:
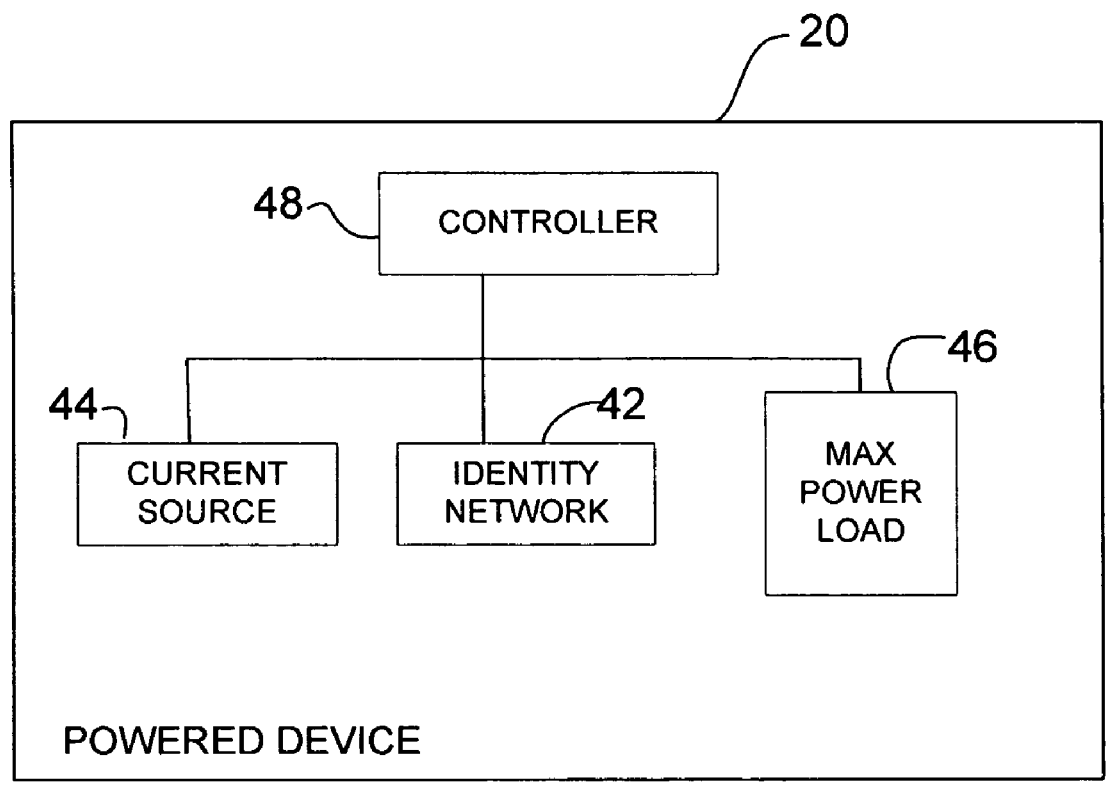
FIG. 2 is a block diagram illustrating an example of components of a powered device.

FIG. 2 is a simplified block diagram illustrating a portion of the components of the powered device 20. The PD 20 includes an identity network 42 that can be presented to the PSE so that the PDs ability to utilize inline power can be confirmed during the detection process. The identity network 42 is one or more electrical components which respond in certain predetermined ways when probed by a signal from the PSE. The IEEE 802.3 standard permits a 25,000 ohm resistor to be presented for discovery by the PD 20 because it is within the permissible range of values (other values may also be used). The resistor may be present at all times or it may be switched into the circuit during the discovery process in response to detection by the PD of discovery signals from the PSE.

In one embodiment, a current source 44 provides fixed current values to the PSE for the classification process. The maximum power load 46 is provided to present a power level to the PSE when the PD is in its maximum power mode. The PD 20 may also include a PD controller 48, which may cause a switch to close coupling the identify network to the network cable so that it may be detected by the PSE during the detection phase, or control the current source to provide a selected current value to the PSE. The PD controller 48 may also select circuitry for operating the PD in a low power or high power mode.

Figure 3:
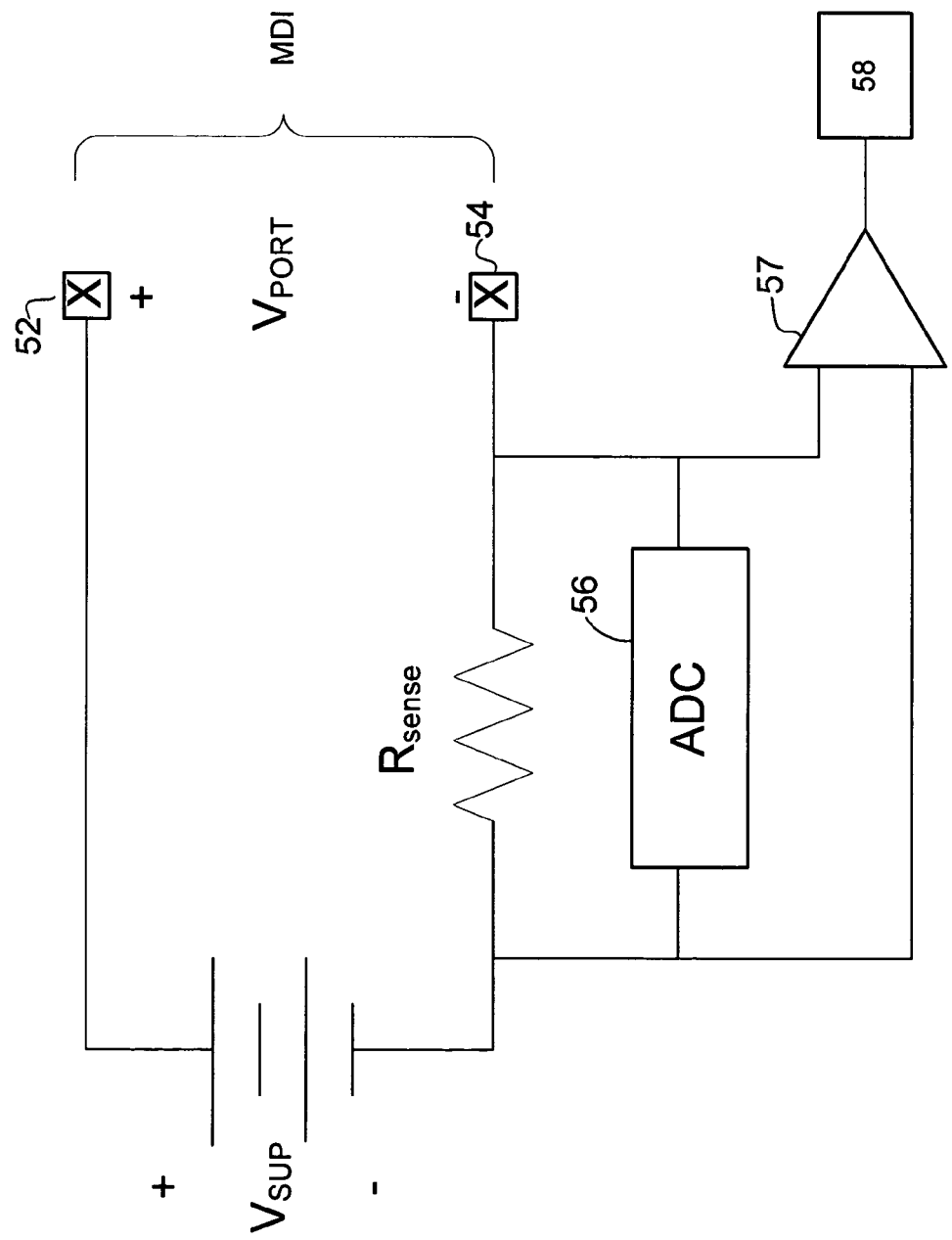
FIG. 3 is a circuit diagram illustrating one embodiment for measuring power drawn at power sourcing equipment.

FIG. 3 is a simplified electrical schematic of one embodiment of power sourcing equipment for use in powering the PD 20 during the powered device powering phase. The PSE is coupled as discussed above over a wired data telecommunications network such as Ethernet through Media Dependent Interfaces (MDIs) to one or more PDs (not shown), at nodes 52, 54. A power source ($V_{sup}$) provides power to the PSE 14 for powering the PDs at $V_{port}$. An ADC (analog to digital converter) 56 coupled in parallel with a sense resistor ($R_{sense}$) is used to measure current. $R_{sense}$ is coupled to the ADC to allow the ADC to measure port current. A mechanism 58 may be provided to monitor the current through $R_{sense}$ and detect an over current condition. (The voltage across the resistor is related to the current going through the resistor (V=IR)). Thus circuitry for mechanism 58 is used for critical instantaneous current measurements while the ADC is used to measure current periodically for use by the software/firmware routines in the PSE controller.

The system preferably measures the port current as well as the port voltage while the PD is powered up. The PSE can therefore compute the actual power consumed by the PD. The power provided by the PSE is $P_{port} = I_{port} * V_{port}$, where $I_{port}$ is the current through the resistor $R_{sense}$ and $V_{port}$ is the voltage at the MDI. This allows the system to accurately police power consumption by the powered device and if the PD is consuming more power than its policing threshold, appropriate action can be taken, as described below.

An amplifier 57 may be used to create a voltage proportional to the voltage across $R_{sense}$. In one embodiment, the output of the amplifier 57 can be compared to a voltage reference at mechanism 58. The voltage reference can be created by a DAC. When the amplified voltage exceeds the voltage reference, a comparator indicates an over current condition. This condition can be used to remove power from the port, start a timer, or trigger an interrupt. Action may be taken if the over current condition exists for a specified period of time. For example, an interrupt may cause a CPU to read the ADC current value.

Since the ADCs available for PoE generally have varying properties, calibration of the ADC is preferably performed. System software may access the ADC through PoE module firmware, store the values required for calibration, and perform the calibration correction for the software application.

The system may utilize hardware abstraction of the ADC. Since the system may have different resolution and references, the software converts the ADC readings into a format that the higher level software works with.

It is to be understood that the PSE circuit shown in FIG. 3 is only one example and that other circuits may be used to monitor power demand of the PD. For example, the circuit may be configured to utilize a digital to analog converter (DAC) rather than the ADC shown in FIG. 3, or both an ADC and DAC may be used, as previously described. Also, the PSE and PD may include additional components as required to perform in accordance with IEEE 802.3, for example.

In an exemplary embodiment, the PSE and PD function in accordance with the requirements of the IEEE 802.3 standard to perform a discovery and classification process. The detection process is carried out periodically over a port to see if an IEEE 802.3 PD is coupled thereto so that inline power may be applied. If an appropriate PD is detected, a classification process is carried out. The classification process may be as described in IEEE 802.3 or another classification process, that provides higher power levels or power within the range of the current IEEE 802.3 power levels, but at more narrowly defined classes may be used. For example, the system may perform classification in accordance with an inline power allocation method such as described in U.S. patent application Ser. No. 11/429,906, filed May 8, 2006, entitled "Inline Power Allocation Method and Apparatus", which is incorporated herein by reference in its entirety.

Figure 4:
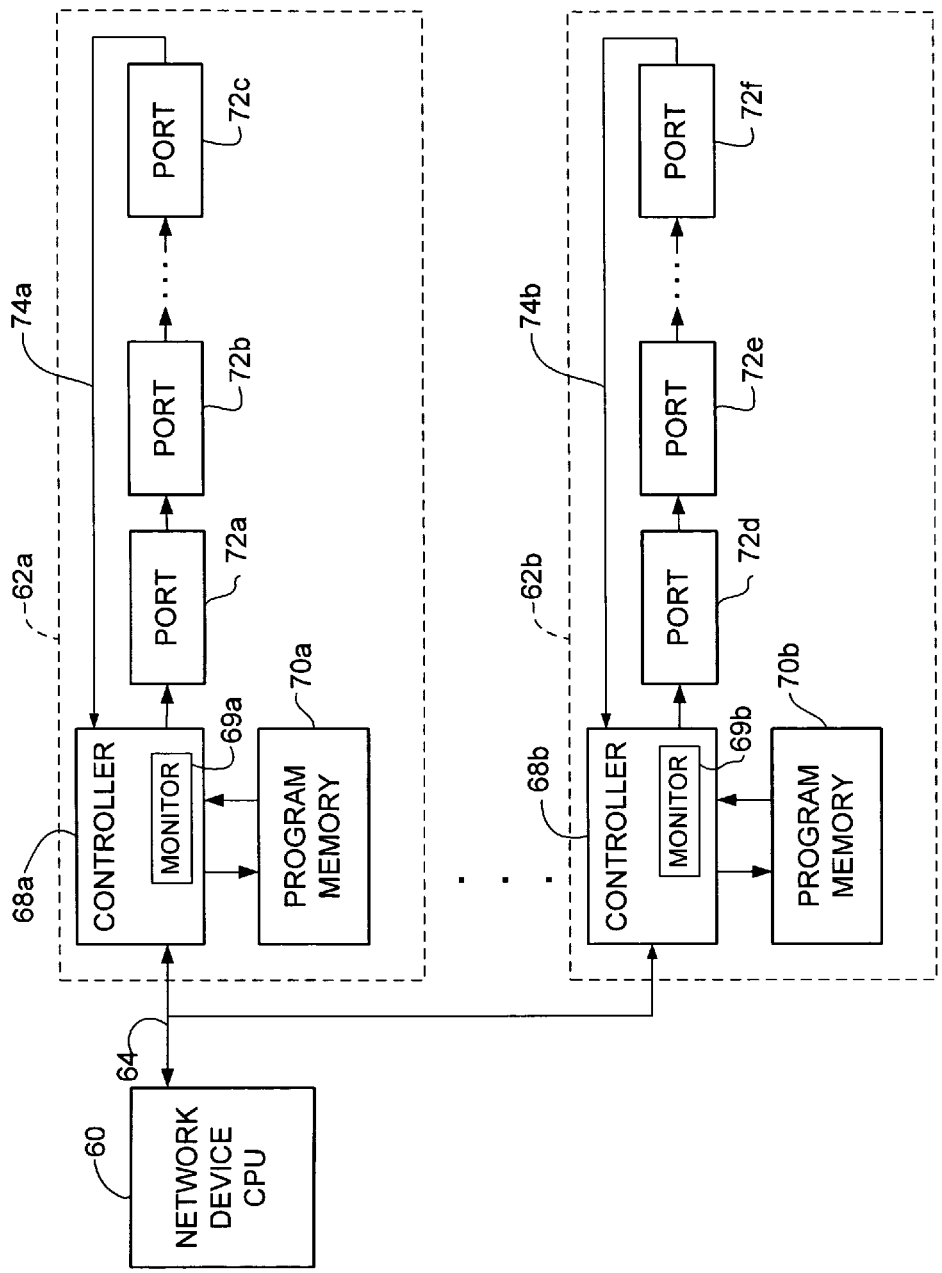
FIG. 4 is a block diagram of an example of a system including a network device and a coupled inline power controller circuit for use in implementing the embodiments.

FIG. 4 illustrates one example of a system for inline powered port control as may be found in a network device such as a switch, router, or the like. A network device CPU (Central Processing Unit) 60 operating under the control of an operating system (e.g., Internetwork Operating System (IOS®) available from Cisco Systems, Inc. of San Jose, Calif.) is coupled to one or more inline power controller modules 62*a*, 62*b* through a communications bus 64. The CPU 60 handles high-level communications between the network device and the respective inline power controller modules 62*a*, 62*b*, as is well known by those skilled in the art.

Inline power controller modules 62*a*, 62*b* include, for example, a controller 68*a*, 68*b* and a program memory 70*a*, 70*b* that stores instructions under which the controller operates. The controller 68*a*, 68*b* includes a monitor 69*a*, 69*b* for monitoring power drawn by the powered device. The controller 68*a*, 68*b* communicates with one or more port interface circuit modules 72*a*, 72*b*, 72*c*, 72*d*, 72*e*, 72*f* over a serial bus interface 74*a*, 74*b*. The port interface circuit modules 72*a*-72*f* include, for example, a digital component, analog component, and one or more inline-powered ports for providing inline powered data telecommunications in a wired data telecommunications network.

The system preferably allows a user to enable/disable power policing, configure cutoff power (policing limit, threshold), configure action to be taken on ports drawing power exceeding their limit, set port priority, and monitor power drawn by the powered device. A user may configure policing on each individual port or a group of ports.

In one embodiment, a user configures a per port policing value in specified watts, with the system performing actual policing at the specified value+safety margin that accounts for internal hardware losses from the power supply. For example, the user may input a $P_{cutoff}$ value and the system converts it to $I_{cutoff}$ based on $V_{sense}$; where $I_{cutoff}=P_{cutoff}/V_{sense}$. The system will then monitor $I_{cutoff}$ (rather than $P_{cutoff}$) at each port and take action as required. The $V_{sense}$ may also be modified to take into account a safety margin.

The PD reports peak power that includes system channel loss. Margin may be provided to take measurement error into account.

Software used to police port power may use the IEEE power average and a margin to determine the power threshold to police. The margin takes into account the error in the power measurement. A system with an ideal ADC would police at a threshold just higher than the port demand. For example, if a class-2 PD is detected the error free average power threshold would be just above 7.0 W.

A powered device may have two or more policing levels associated therewith, each corresponding to operation of the powered device at a different power level. While traditional powered devices tend to draw near their peak demand regardless of their operating condition, new intelligent PDs may draw significantly less power during certain operating conditions (e.g., IP phone on hook). The PD may negotiate its needs and acknowledge its agreement with the PSE. As the PD changes its power level, the PSE updates the power demand for its policing threshold. If the new power level of the PD is greater than the old power level and the PSE is able to provide power at the higher level, the PSE will begin policing at the new power level. If the new power level of the powered device is less than the old power level, the PSE will begin policing at the new power level after the PD acknowledges that it has moved to the new power level. These constraints ensure that policing occurs at the correct power level for the current operating condition.

Action to be taken upon detection of a powered device drawing power exceeding its policing limit may include, for example, logging a warning message, sending a warning message to the powered device, instructing the PD to reduce its power level, or shutting down a port. The initiated action may depend on whether the PSE has exceeded its power budget and the priority level of the powered device. For example, if the PD has exceeded its policing limit and the PSE has not exceeded its power budget, only a warning message may be logged. However, if the power budget at the PSE has been exceeded, the PD may be instructed to reduce its power level or if the PD has only one operational power level, power may be removed from the PD.

In another example, the PD that exceeded its policing limit may be a high priority device. The PSE may then remove power from a lower priority device and provide the extra power to the high priority PD. In this case, a new policing limit may be set for the high priority device.

It is to be understood that the above actions are provided only as examples and that other actions may be initiated upon detection of a PD exceeding its policing limit, based on policies set, for example, by a network administrator or by default.

In one embodiment, action is only initiated if the PD has exceeded its policing limit for a set period of time. This will help to prevent transient errors. For example, the policing controller may monitor current ($I_{sense}$) continuously (e.g., every 120 ms) and if at anytime $I_{sense}$ exceeds $I_{cutoff}$ for 8 consecutive samples (about 1 sec) action is taken.

The operating system preferably polls the controllers for $I_{sense}$, and $V_{port}$ periodically (e.g., every 1 sec) by sending POE_GET_CURRENT_SENSE and POE_GET_VOLTAGE_SENSE commands to the controller. An example of an alternative polling scheme is to poll for $V_{port}$ whenever PD is inserted or removed, or summation of $I_{sense}$ for all port changes over 5%.

The polling command may be sent regardless of whether policing is enabled on a given port, since power sensing is useful information for the user. This information may also be used to calculate actual total system power usage. The response for the POE_GET_CURRENT_SENSE contains $I_{sense}$ for all ports that are in power good state. The response for POE_GET_VOLTAGE_SENSE contains $V_{port}$ at a first port of each power controller.

Power budgeting at the power supply is preferably performed based on a PDs IEEE 802.3 classification or other suitable method (e.g., CDP) even when policing is enabled. This is to prevent an overload at the power supply if the user elects only to send a warning message during policing without shutting down ports.

In addition to reporting a peak power demand, the powered device may also provide the power supply controller with additional details, such as predicted high demand, so that the controller has time to obtain and allocate extra power for a set duration. The powered device may request a temporary change to its policing level. For example, a video camera may require 30 W for 12 seconds. The video camera sends a request to the PSE and the PSE updates its policing level for the requested duration. A network administrator may also temporarily or permanently override a policing level.

The powered device may be coupled to two PSEs; a primary PSE and backup PSE. The primary PSE preferably sends power demand details provided by the powered device to the backup PSE so that the backup PSE has up to date information for power requirements at the powered device when the PD switches to the backup PSE following a failure at the primary PSE.

Policing may be used to overcome the course power classification granularity provided by IEEE 802.3. For example, the policing system and method described herein may be used to permit a system to power-on specific PDs that request more power than they need. The PSE may identify the PDs or a user may provide an override for specific ports. This translates a power request to an actual power need. For example, a PD that requires 10 W will request a maximum of 13 W based on the IEEE 802.3 classification method. Using the method proposed in this invention, the power accounted for at the PSE would be 10 W and the policing threshold would also be 10 W. If a user overrides all power to translate 13 W requests into a 10 W need and then uses a powered device that consumes 13 W, the port will remain powered if there is power available in the power budget. If there were no policing, a translation system may power off the port exceeding 10 W, even if there were extra power available at the PSE.

In the above example, the extra power may be used to power additional PDs in the system. For a defined system power budget, policing helps to maximize the number of PDs in the system while protecting the system.

Figure 5:
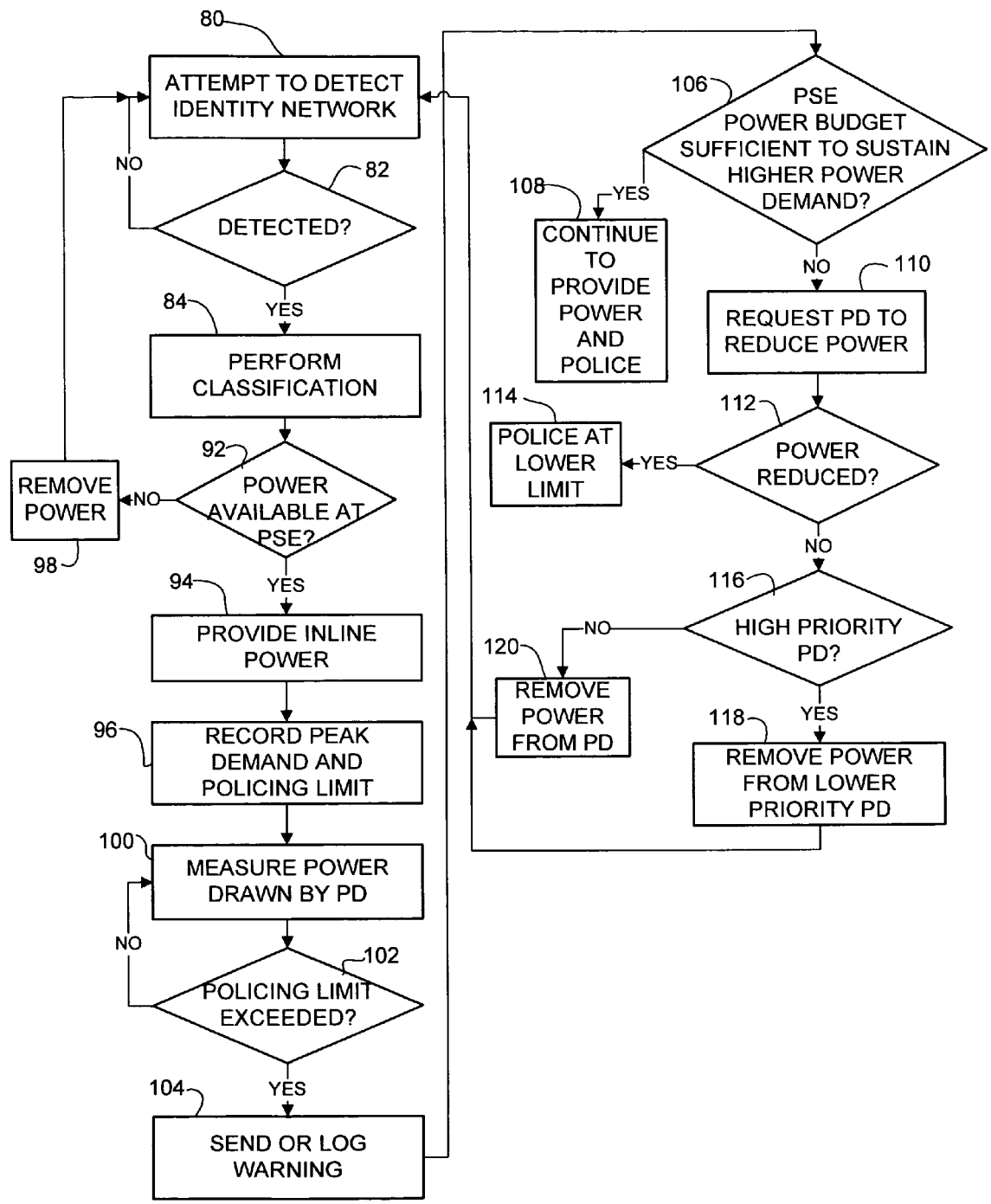
FIG. 5 is a flowchart illustrating an example of a method for policing inline power in accordance with one embodiment.

FIG. 5 is a flowchart illustrating one example of a method for policing inline power. At step 80 the PSE attempts to discover the PD by carrying out a detection process aimed at verifying the presence of an appropriate identify network disposed across the conductors of the wired data telecommunications network. The PSE applies a discovery signal to measure resistance and determine if the identity network is present. If no identity network is found (step 82), control reverts back to step 80 to continue the detection process from time to time until an identity network is found. If an identity network is found, control passes to step 84 where the classification process starts.

The classification process involves applying a voltage in a classification range to the PD. The PD may use a current source to send a predetermined classification current signal back to the PSE. The classification current signal corresponds to the class of the PD. Each measured current corresponds to a class, such as the IEEE 802.3 classes described above, or other classes defined in IEEE 802.3 at or a non-IEEE 802.3 standard system. These classes are determined by correlating the measured current with a class value or other representation. It is to be understood that other classification methods such as CDP may be used.

If the PSE has sufficient capacity to meet the power requirements of the PD, the PSE allocates power to the PD and provides corresponding inline power to the PD (steps 92 and 94). The PSE records the peak demand for its power accounting purposes and records a policing limit (step 96). As previously described, the policing limit preferably incorporates a safety margin.

If the PSE does not have sufficient capacity to provide the requested power, the PSE removes power (e.g., classification voltage) from the PD (step 98). The process returns to step 80 and the PSE detects the PD during its next detection cycle and performs the classification process (steps 82 and 84). A classification process, such as described in U.S. patent application Ser. No. 11/429,906, referenced above, may be used to allow the powered device to operate in a low power mode, albeit with some reduced functionality.

After power is provided to the PD, the power supply controller measures power drawn and polices each PD (step 100). If a PD draws power that exceeds its policing limit for a specified interval, action is taken (steps 102 and 104). The action taken may include logging a warning or sending a warning to the powered device (step 104).

The PSE then checks its power budget to see if it can sustain the higher power demand from the PD (step 106). If the PSE has sufficient power, the PD will remain powered (step 108). If the higher power demand exceeds the PSE's power budget, the PSE may then request the PD to reduce its power level (step 110). If the power drawn by the PD is reduced to a lower power setting, the PSE updates its policing limit to correspond to the lower power operating mode for the PD (steps 112 and 114) and continues to provide power and police. If the PD does not reduce its power demand below the policing limit, the PSE may check the priority of the PD (step 116). If the PD has a high priority, the PSE may remove power from a lower priority PD (step 118). If the PD is a low priority device, the PSE will remove power from the PD (step 120).

It is to be understood that the process illustrated in FIG. 5 is just one example and that steps may be added or removed. For example, if the PDs are not assigned a priority level, steps 116 and 118 can be skipped. Also, the PSE may store information as to whether or not a PD has a lower power level operating mode, in which case, the steps of requesting the PD to reduce its power level (steps 110-114) may be skipped if the PSE knows that the PD has only one operating mode. The network device may also broadcast to all of the powered devices a request to reduce their power level, rather than only requesting a specific powered device to reduce their power level. Details of the portions of the process performed in accordance in conventional inline power allocation methods (which are well known by those skilled in the art) are not shown.

While embodiments and applications have been shown and described, one of ordinary skill in the art will readily recognize that there could be variations made to the embodiments without departing from the inventive concepts disclosed herein. Accordingly, it is intended that all matter contained in the above description and shown in the accompanying drawings shall be interpreted as illustrative and not in a limiting sense.

What is claimed is:

1. A method for policing inline power, the method comprising:
monitoring power drawn by one or more powered devices at power sourcing equipment, each of the one or more powered devices having a policing limit associated therewith;
if power drawn by one of the powered devices exceeds the policing limit for the powered device:
determining if a power budget of the power sourcing equipment has been exceeded;
if said power budget has not been exceeded, continuing to provide power to the one or more powered devices; and
if said power budget has been exceeded, initiating an action at the power sourcing equipment;
wherein initiating an action comprises requesting at least one of the powered devices to operate in a low power mode and removing power from one of the powered devices if the powered device requested to operate in a low power mode does not switch to said low power mode.

2. The method of claim 1 where initiating an action comprises removing power from the powered device exceeding the policing limit.

3. The method of claim 1 further comprising changing said policing limit associated with the powered device upon receiving notification that the powered device has switched to said low power mode.

4. The method of claim 1 wherein each of the one or more powered devices has a priority level assigned thereto.

5. The method of claim 4 wherein initiating an action comprises, if the powered device exceeding the policing limit has a high priority level, removing power from another one of the powered devices that has a lower priority level.

6. The method of claim 1 wherein said power budget is based on a summation of peak power demand of each of the one or more powered devices.

7. The method of claim 1 wherein said power budget is based on a summation of an average power demand of each of the one or more powered devices.

8. The method of claim 1 further comprising calculating a statistical value of power demand of the one or more powered devices and utilizing said statistical value to define said power budget.

9. The method of claim 1 wherein monitoring power drawn by the one or more powered devices comprises monitoring a current at periodic intervals and wherein one of the powered devices exceeds the policing limit only if the policing limit is exceeded for a defined period of time.

10. Apparatus for policing inline power, the apparatus comprising:
power sourcing equipment operable to provide inline power to one or more powered devices, each of the powered devices having a policing limit associated therewith;
a monitor configured to monitor power drawn by the one or more powered devices;
a controller configured to detect one or more of the powered devices exceeding the policing limit and determine if a power budget of the power sourcing equipment has been exceeded, if said power budget has not been exceeded, continue to provide power to the one or more powered devices, and if said power budget has been exceeded, initiate an action at the power sourcing equipment; and
a memory for storing said policing limits and said power budget;
wherein said action comprises requesting at least one of the powered devices to operate in a low power mode and the controller is configured to remove power from the powered device requested to operate in a low power mode, if the powered device does not switch to said low power mode.

11. The apparatus of claim 10 wherein said action comprises removing power from the powered device exceeding the policing limit.

12. The apparatus of claim 10 wherein the controller is configured to change the policing limit associated with the powered device upon receiving notification that the powered device has switched to said low power mode.

13. The apparatus of claim 10 wherein each of the one or more powered devices has a priority level assigned thereto.

14. The apparatus of claim 13 wherein said action comprises, if the powered device exceeding the policing limit has a high priority level, removing power from another one of the powered devices that has a lower priority level.

15. The apparatus of claim 10 wherein said power budget is based on a summation of peak power demand of each of the one or more powered devices.

16. The apparatus of claim 10 wherein said power budget is based on a summation of an average power demand of each of the one or more powered devices.

17. The apparatus of claim 10 wherein the controller is configured to calculate a statistical average of power demand of the one or more powered devices and utilize said statistical average to define said power budget.

18. The apparatus of claim 10 wherein the monitor is configured to monitor a current at periodic intervals and wherein one of the powered devices exceeds the policing limit only if the policing limit is exceeded for a defined period of time.

19. The apparatus of claim 10 wherein the monitor comprises an analog to digital converter.

20. The apparatus of claim 10 wherein the controller is further configured to log a warning message upon detection of one of the powered devices exceeding the policing limit.

21. The apparatus of claim 10 wherein said action comprises sending a warning message to the powered device exceeding said policing limit.

22. The apparatus of claim 10 wherein the controller is configured to receive a request from one of the powered devices to modify the policing limit associated therewith for a limited duration of time.

23. The apparatus of claim 10 wherein the controller is operable to receive the policing limit from each of the one or more powered devices following detection and classification of the powered device.

24. The apparatus of claim 10 wherein the controller is operable to assign a priority level to the one or more powered devices.

25. The apparatus of claim 10 wherein the controller is configured to calculate an average power demand for each of the one or more powered devices and wherein said average power demands are utilized in calculating said power budget.

26. The apparatus of claim 10 wherein the power sourcing equipment is configured to operate as a backup power source for one or more powered devices and is operable to receive power demand information from the one or more powered devices.

* * * * *